March 16, 1943.   R. R. PITTMAN ET AL   2,314,017
POWER DIRECTIONAL FUSED NETWORK
Filed Feb. 8, 1940   2 Sheets-Sheet 1

INVENTORS
Ralph R. Pittman
Carroll H. Walsh

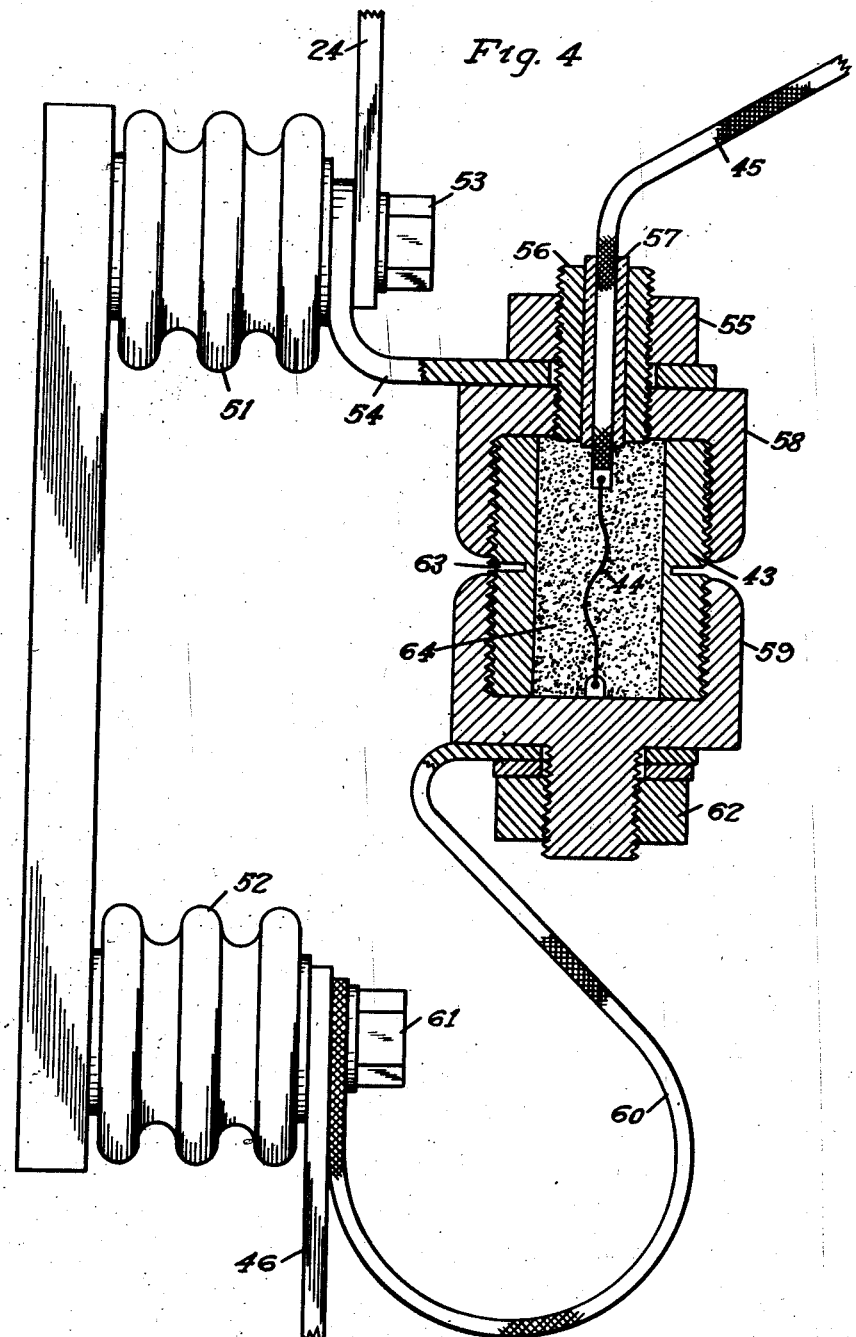

Patented Mar. 16, 1943

2,314,017

UNITED STATES PATENT OFFICE 2,314,017

POWER DIRECTIONAL FUSED NETWORK

Ralph R. Pittman and Carroll H. Walsh, Pine Bluff, Ark.

Application February 8, 1940, Serial No. 317,875

6 Claims. (Cl. 175—294)

This invention relates to network systems commonly used in electrical distribution systems for the purpose of supplying a load circuit from a plurality of sources to thereby assure a high degree of continuity of supply to the load circuit.

Among the objects of the invention may be noted the provision of a network for connection to a load circuit, the network embodying fusible means, and the latter cooperating with the associated transformer in such a manner that the fusible means will disconnect the load circuit from the transformer in response to the transmission of power in a direction from the load circuit to the transformer at a relatively lower current in the load circuit than that required to cause the fusible means to act to effect the disconnection when power is transmitted in the normal direction from the transformer to the load circuit. Otherwise stated, it is an object of the invention to provide a power-directionally fused organization such that power may be transmitted toward the load circuit at high rates without effecting operation of the fusible connection, and a relatively small rate of power transmission away from the load circuit will cause immediate disconnection of the supply circuit through operation of the fusible connection.

As is now well known, the failure of one of several supply circuits which jointly supply the load circuit of a network system may cause complete interruption of the load circuit unless immediately disconnected therefrom, for the reason that the remaining supply circuits transmit power through the load circuit to the failed supply circuit. To effect the desired interconnection, so-called network protectors in the form of large heavy current duty contactors, controlled through some sort of reverse power relays have been widely used. Fused networks have long been recognized as much less expensive arrangements than those employing the so-called network protectors, but have heretofore been used but little for the reason that the fuses were so arranged that they fused without regard to direction of power transmission. The present invention is therefore directed to an organization providing discriminatory fuse operation with respect to direction of power transmission.

With these and other objects in view which will appear as the description proceeds, our invention resides in the novel organization and arrangement of the cooperating elements for accomplishing the above mentioned objects, and the scope of the invention will be indicated in the appended claims.

Figure 1:
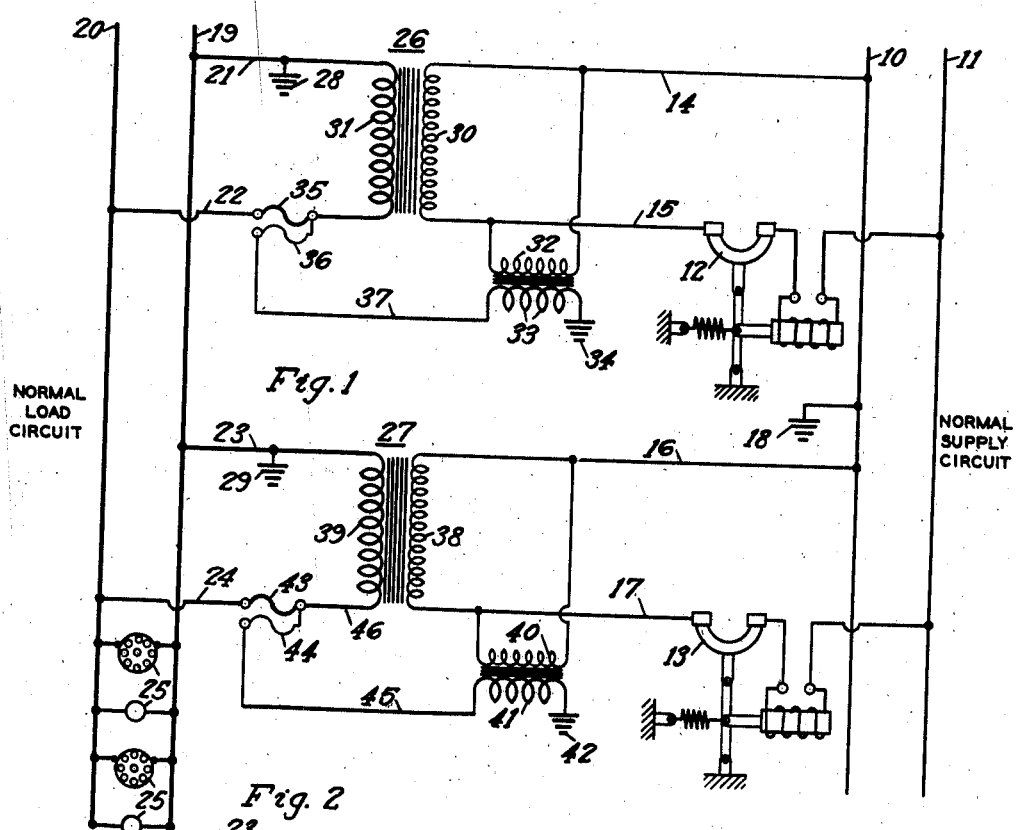
Figure 2:
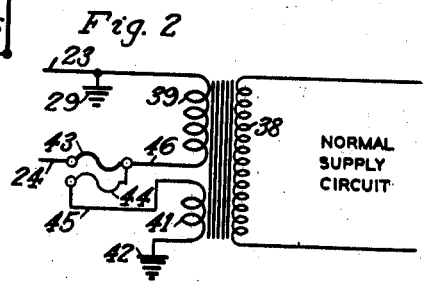
Figure 3:
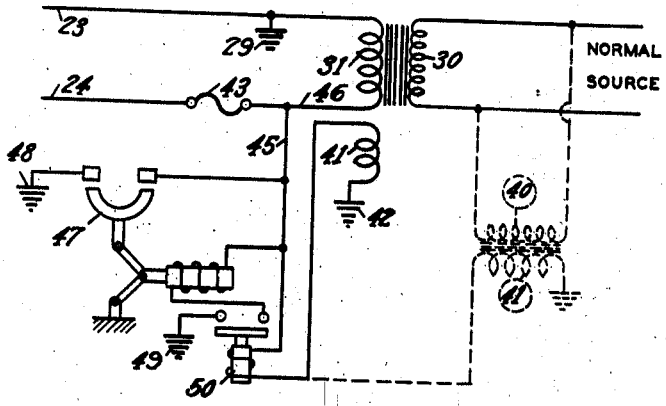

In the drawings, Fig. 1 is a diagram of a single phase network system, embodying two power-directional fused networks; Figs. 2 and 3 are diagrams of alternate types of power-directional fused networks; and Fig. 4 is a sectional view of a fuse arrangement suitable for use in our network.

Referring first in detail to Fig. 1, the conductors 10 and 11 may be regarded as those constituting a supply circuit, the conductor 10 being grounded as indicated at the numeral 18, and the conductors 19 and 20 as those constituting a load circuit to which is connected the loads 25. Two networks 26 and 27 are shown arranged for supplying power from the supply circuit to the load circuit, being respectively normally connected to the supply circuit through the circuit breakers 12 and 13, and the supply connecting conductors 14 and 15, and 16 and 17. The networks 26 and 27 are respectively connected to the load circuit through the connecting conductors 21 and 22, and 23 and 24, the conductors 21 and 23 being connected to the grounds 28 and 29 respectively, in accordance with current practice.

The network 26 includes a main transformer having the supply winding 30 and the load winding 31, the auxiliary transformer having the supply winding 32 and the load winding 33, the load fuse 35, the interconnecting circuit fuse 36, and the interconnecting circuit 37 which is completed through the ground 34. The network 27 is similarly constituted, including the main transformer having the supply winding 38 and the load winding 39, the auxiliary transformer having the supply winding 40 and the load winding 41, the load fuse 43, the interconnecting circuit fuse 44, the main transformer connecting conductor 46, and the interconnecting circuit 45 which is completed through the ground 42. It is apparent that the main and auxiliary transformers are in parallel circuit relation with repect to the load circuit; that the parallel arrangement is connected to the load circuit through the load fuse 35 or 43, and that the interconnecting fuse 36 or 44, is in series circuit relation with only the load winding of the auxiliary transformer.

For reasons shortly to appear, it is desirable that the interconnecting circuit fuse 44 cooperate with the load fuse 43 to disconnect the load circuit from the main transformer when the interconnecting fuse is fused. We therefore now describe the fuse structure illustrated by Fig. 4, which is suitable for operation in the desired manner.

The above-mentioned fuse structure (Fig. 4)

includes a pair of spaced insulators 51 and 52, to the outermost ends of which are attached respectively the load connecting conductor 24 and the main transformer connecting conductor 46. The conductor 24 is electrically connected, by means of the cap screw 53, to the upper terminal 54, the latter extending outwardly from the insulator 51 to provide a support for the fuse assembly. The latter includes the load fuse 43, which is a tubular metal member having the deep, narrow groove 63 extending circumferentially around the central portion, so as to weaken the wall of the tube mechanically, while providing an electrical path of large current carrying capacity.

The tubular load fuse member 43 is threaded at its respective ends, the upper and lower caps 58 and 59 fitted thereon, and the hollow or chamber of the tube is filled with the non-conducting explosive or inflammable material 64. The interconnecting fuse 44 extends longitudinally through the tubular load fuse member 43, being electrically connected at one end by soldering to the cap 59, and at the other to the interconnecting conductor 45, the latter extending to a point outside the chamber through the bushing 56 of the upper cap 58. An insulated sleeve 57 is fitted between the outside of the conductor 45 and the inside of the bushing 56, to insulate the conductor 45 from the cap 58. The outside of the bushing 56 is threaded to receive the nut 55, and the upper terminal 54 conveniently clamped between the latter and the upper surface of the upper cap 58.

The lower cap 59, which is a terminal common to both the interconnecting fuse 44 and the load fuse 43, is preferably connected by means of the flexible conductor 60 to the conductor 46, the respective ends of the conductor 60 being clamped to the respective members by the cap screw 61 and the lower terminal nut 62.

From the above description, it will be apparent that the fusing of the fuse 44 will ignite the inflammable material 64, and this results in either melting or fracturing the small section of metal at the base of the groove 63. The lower portion of the fuse 43, together with the attached parts, then falls under the influence of gravity, thereby effectively open-circuiting both the load and interconnecting circuits at substantially the same time.

Having explained the construction and operation of the fuse organization, we will now explain more in detail the organization of the network 27, which includes the fuse organization.

As illustrated, and previously explained, the main and auxiliary transformers operate normally in parallel to supply power from the supply circuit to the load circuit. It is apparent that these transformers, if they have the same voltage ratio, impedance, and ratio of resistance to reactance, will divide the load equally when the supply windings are energized, also that, if they have the same voltage ratio and impedance, there will appear at no-load no circulating current in the conductor 45, or the fuse 44, in series therewith.

If, however, the auxiliary transformer has a higher voltage ratio than the main transformer, at no load a current will circulate between the transformers, and through the fuse 44. We therefore select transformers sufficiently different in voltage ratio to cause a current to circulate through the fuse 44 at no-load which is insufficient to cause it to fuse, but which, if increased, will cause operation of the fuse organization.

Having established the no-load circulating current, in the desired direction, it will be apparent that the first increment of load added to the network will algebraically add to the circulating current, and since the portion of the load current supplied by the auxiliary transformer is opposite in direction from the established circulating current, the resultant current through the fuse 44 is decreased, while that through the fuse 43 is that due to the load. It may now be observed that the addition of load supplied in the direction of power from the supply to the load acts to decrease the circulating current in the fuse 44. As load is increased on the load circuit, the circulating current finally becomes zero, which may be made to occur at say 200% rating of the main transformer, while load beyond this point of course increases the circulating current in the reverse direction.

We next examine the conditions upon the occurrence of a fault caused, for example, by the short-circuiting of the connecting conductors 16 and 17. The breaker 13 opens due to abnormal current, thus disconnecting the network 27 from the supply circuit. Power is then supplied to the fault through the network 26, the load circuit, and the network 27, and it is of course necessary to disconnect the network 27 from the load circuit if the latter is to remain energized, as desired. The normal direction of power is reversed through the network 27, but is in normal direction through the network 26. The current through the interconnecting fuse 44 therefore not only reaches the normal no-load magnitude, but is increased due to power supplied in reverse direction to the fault from the auxiliary transformer, the current element of such power adding arithmetically to the no-load circulating current, and thereby causing the immediate fusing of the fuse 44. This occurrence, as previously pointed out, causes operation of the fuse 43, and the network 27 is thus disconnected from the load circuit.

So long as the fuse 44 is capable of being blown upon the occurrence of a current therethrough not greatly in excess of the no-load circulating current, the main and auxiliary transformers may be of any desired size. For example, one practical organization consists of a 500 kva., 3 phase main transformer, and a 3 kva., 3 phase auxiliary transformer. We have herein illustrated and described single phase systems for the purpose of simplicity, but it will of course be obvious that the application to three phase circuits may be readily accomplished. The fuse 43 may be constructed to have a very high carrying capacity, while the fuse 44 may be constructed to operate on relatively very small currents, even of the order of fractional amperes, if desired.

Fig. 1 illustrates only two networks, 26 and 27. Additional networks may of course be added, in which event each network supplied from non-faulted conductors would transmit power in a normal direction to reduce the circulating current in each such network, while the circulating current in that network transmitting power from the remaining networks and load circuit, due to faulted supply conductors, is immediately increased and the network disconnected from the system through the operation of the fuses as described above.

It may be noted that the voltages applied to main and auxiliary supply windings 30 and 38 are in phase, so that a supply winding common to both main and auxiliary windings may be used in the organization of our network. Fig. 2 illustrates such an arrangement, which is somewhat less expensive than those shown in Fig. 1, but which operates in exactly the same manner.

If desired, the increase in circulating current in response to reversal in direction of power transmission may be utilized to effect disconnection of the network through mechanical means to cause the operation of the fuse 43. Fig. 3 illustrates such an arrangement, in which a predetermined current in the interconnecting conductor 45 causes the contacts of the relay 50 to close, this action resulting in the energization of the control coil of the normally-open circuit breaker 47 through the ground 49. The breaker 47, closing in response to the energization of its control coil, applies the load circuit voltage to the fuse 43 through the ground 48, causing the fuse to operate to disconnect the network from the load circuit. This organization is much less expensive than one employing a circuit breaker in the load circuit, since a smaller breaker may be used because it is not required to interrupt the fault current, the latter function being accomplished by the load circuit fuse 43.

From the above description, it will be apparent that our network is an organization in which the transformers cooperate with the fuse arrangement to provide an arrangement in which the fuses may be caused to operate when power is transmitted at a predetermiend rate in a direction opposite that of the normal direction, but will not operate even when power is transmitted at a rate substantially greater than the predetermined rate in the normal direction. That is to say, a power-directional fused network is provided, as described and illustrated, in a simple and inexpensive organization which does not require the use of large and expensive contactors, reverse power relays, or other currently used appurtenances.

It will be noted that we have mentioned in our description that the difference in voltage ratio of the main and auxiliary transformers provides the voltage for causing the desired current to flow in the interconnecting circuit at no-load. We believe this to be the simplest method of accomplishing the desired result, but it will be obvious that transformers differing widely in regulation or impedance may be used to accomplish a substantially equivalent result.

We claim as our invention:

1. A power-directional network comprising transformer means including two transformer windings having differing electrical characteristics, an interconnecting circuit electrically connecting said windings in parallel arrangement to cause a predetermined current to circulate through said windings in series circuit relation when said windings are energized, a first fusible means interposed in series with said interconnecting circuit, and means including a second fusible element serially interposed between and electrically connecting a load circuit to said parallel arrangement, the arrangement being such that current incident to load on said load circuit decreases the current in said interconnecting circuit to a magnitude less than said predetermined current, and means responsive to the fusing of said first fusible means for causing said second fusible means to disconnect said load circuit upon the passage through said first fusible means of a current exceeding said predetermined current.

2. A power-directional network comprising a main transformer and an auxiliary transformer, each of which has a supply winding and a load winding said transformers differing a predetermined amount in voltage ratio, means connecting the respective supply windings in parallel relationship, means for connecting a load circuit to the parallel arrangement of the load windings of said transformers including an interconnecting circuit therebetween so arranged that the current circulating in said interconnecting circuit when power is transmitted in a direction from said transformers to said load circuit at a predetermined rate is less than the current circulating when power is transmitted in a direction from said load circuit to said transformers at the same rate, current responsive means interposed in series relation with said interconnecting circuit, and means responsive to the passage of a predetermined current through said current responsive means for disconnecting said load circuit from said transformers.

3. A power-directional network comprising transformer means having at least one winding electrically connected to a supply circuit and at least two additional windings having differing terminal voltages with respect to one another when said transformer means is energized, an interconnecting circuit electrically connecting said two windings in parallel relationship whereby a predetermined circulating current is caused to flow through said circuit, a first fusible means interposed in series relationship with said interconnecting circuit, and the serial arrangement of said additional windings established by said interconnecting circuit means including a second fusible means normally connecting a load circuit to the parallel arrangement of said two windings of said transformer means, and means responsive to the fusing of said first fusible means for rupturing said second fusible means whereby said transformer means is disconnected from said load circuit.

4. A power-directional network comprising transformer means electrically connected to a supply circuit, said transformer means including two transformers which differ in electrical characteristics, and each of which has a high voltage winding connected in shunt with said supply circuit, and a low voltage winding, means electrically connecting the low voltage windings of said transformers in parallel relationship, a first fusible means interposed in series relationship with the serial arrangement of said two low voltage windings established by the parallel connection means in series with and normally including a second fusible means for electrically connecting a load circuit to the parallel arrangement of said low voltage windings of said transformers so as to normally transmit power in a direction from said windings to said load circuit when said supply circuit is energized, the arrangement being such that the current which passes through said first fusible element when power is transmitted at a predetermined rate from said transformer windings to said load circuit is increased when power is transmitted at a rate less than said predetermined rate in the same direction, and means responsive to the passage of a predetermined current through said first fusible means for causing the rupture of said second fusible means whereby said load circuit is disconnected from said transformer means when the rate of transmission of power is less than said predetermined rate.

5. A power-directional network for normally supplying a load circuit from a supply circuit and for disconnecting said load circuit from said supply circuit in response to a reversal in direction of power, said network comprising a transformer having at least one winding connected to said supply circuit and at least a main winding and an auxiliary winding, said main winding and auxiliary windings being so constructed that the no-load terminal voltage of said main winding exceeds that of said auxiliary winding, means constituting an interconnecting circuit electrically connecting said main and auxiliary windings in parallel relationship whereby circulating current due to the difference in terminal voltages of said main and auxiliary windings is caused to flow in said interconnecting circuit, fusible means interposed in said interconnecting circuit, said fusible means being electrically connected in series with the serial arrangement of said main and auxiliary windings which arrangement results from the connection of said main and auxiliary windings in parallel with said load circuit and means responsive to the passage of a predetermined current through said fusible means for effecting disconnection of said load circuit from said supply circuit.

6. An alternating current network for connecting a load circuit to a supply circuit comprising a transformer having at least one supply winding and two additional load windings, said two additional windings differing with respect to one another in open circuit terminal voltage when said supply winding is energized, means connecting said supply winding in shunt with said supply circuit, means connecting said load windings in parallel with said load circuit, a first current responsive means connected in series relation with the serial arrangement of said two additional load windings which arrangement results from the connection of said load windings in parallel with said load circuit, a second current responsive means connected in series relationship with said load circuit, and means responsive to the passage of a predetermined current through said first current responsive means for causing said second current responsive means to effect disconnection of said load circuit from the parallel arrangement of said load windings.

RALPH R. PITTMAN.
CARROLL H. WALSH.